United States Patent [19]

Webber et al.

[11] Patent Number: 5,594,452
[45] Date of Patent: Jan. 14, 1997

[54] METHOD AND SYSTEM FOR LOCATING AN UNKNOWN TRANSMITTER USING CALIBRATED OSCILLATOR PHASES

[75] Inventors: John C. Webber, Herndon, Va.; Curtis A. Knight, Washington, D.C.

[73] Assignee: Interferometrics, Inc., Vienna, Va.

[21] Appl. No.: 352,779

[22] Filed: Dec. 1, 1994

[51] Int. Cl.⁶ .................................................. H04B 7/185
[52] U.S. Cl. ...................... 342/353; 342/378; 342/174; 342/357; 342/358
[58] Field of Search ................................ 342/442, 378, 342/174, 353, 358, 357; 455/13.1

[56] References Cited

U.S. PATENT DOCUMENTS

| | | | |
|---|---|---|---|
| 3,593,183 | 7/1971 | Kravchenko et al. | 331/38 |
| 4,740,792 | 4/1988 | Sagey et al. | 342/457 |
| 4,751,512 | 6/1988 | Longaker | 342/357 |
| 5,008,679 | 4/1991 | Effland et al. | |
| 5,379,320 | 1/1995 | Fernandes et al. | 375/1 |
| 5,467,282 | 11/1995 | Dennis | 364/449 |

OTHER PUBLICATIONS

John M. Gipson et al., "Interference Location By Pre-Detection TDOA And FDOA Measurements," Interferometrics, Inc. Proposal Number 8903-21, pp. 1-24, Mar., 1989.
Interferometrics, Inc., Proposal for "Construction of a Satellite Transmitter Location System (TLS)," pp. 1-24, Nov., 1992.

Primary Examiner—Thomas H. Tarcza
Assistant Examiner—Dao L. Phan
Attorney, Agent, or Firm—Finnegan, Henderson, Farabow, Garrett & Dunner, L.L.P.

[57] ABSTRACT

In a method and system for locating an unknown transmitter which emits an interfering signal, multiple signals, including a phase-calibrating signal and the interfering signal, are simultaneously observed within a passband. These signals are then simultaneously cross-correlated. The phase-calibrating signal is then isolated from the cross-correlated signals and processed to determine an amount of offset to compensate for frequency fluctuations between local oscillators in satellites, which receive and retransmit the phase-calibrating signal and the interfering signal.

20 Claims, 5 Drawing Sheets

METHOD AND SYSTEM FOR LOCATING AN UNKNOWN TRANSMITTER USING CALIBRATED OSCILLATOR PHASES

BACKGROUND OF THE INVENTION

1. Field of Invention

The invention relates to a method and system for locating an unknown transmitter. More particularly, the invention relates to a method and system for locating an unknown radio-frequency transmitter using calibrated oscillator phases.

2. Description of Related Art

Various techniques have been proposed for locating an unknown transmitter that causes interference at a satellite receiver. One such technique is described in U.S. Pat. No. 5,008,679 ("the '679 patent"), entitled "Method and System for Locating an Unknown Transmitter" issued to Effland et al. on Apr. 16, 1991, which is hereby incorporated by reference.

The '679 patent describes a method and system for determining the locations of unknown transmitters that serve as sources of interference to receivers, such as geosynchronous satellite communications systems, low-Earth-orbit satellites, aircraft, and other receivers of electromagnetic radiation. According to the '679 patent, at least two satellite receivers receive an interfering signal from an unknown transmitter and retransmit these signals to a receiving station. The receiving station receives and processes the retransmitted interfering signals through cross-correlation to determine the location of the unknown transmitter.

As discussed, the method described in the '679 patent preferably employs at least two satellite receivers. Each of these satellite receivers typically includes at least one transponder, which comprises a receiver, a frequency converter, and a retransmitter. The frequency converter will usually contain a local oscillator, which is phase-locked to a reference frequency source, such as a crystal oscillator.

The crystal oscillators on each of these satellites, however, are independent from each other. As a result, the frequencies or phases of the crystal oscillators, and thus those of the local oscillators, can drift unpredictably with respect to each other due to, for example, age, temperature, mechanical force, or power supply voltage. Such drift effectively limits the length of time that the signals remain sufficiently coherent in phase for a cross-correlation process to work, which, in turn, limits the strength of the detectable signal. Thus, it is desirable to compensate for drift between local oscillators in the satellite receivers.

One proposed method for compensating for such drift is described in a report entitled "Field Trials of a Transmitter Location System Using INTELSAT Satellites," by John E. Effland et al., INTEL-874 Phase 3, Dec. 30, 1991 (hereinafter "the INTELSAT report"). According to this proposed method, in addition to the interfering signal, the two satellites also receive a phase-calibrating signal from a known transmitter and retransmit this signal to the receiving station. The receiving station receives the retransmitted phase-calibrating signals separately from the interfering signals and processes them independently from the interfering signals to obtain a compensation signal. This compensation signal is then used to correct inaccuracies in the retransmitted interfering signals resulting from discrepancies in phase or frequency between the oscillators of the satellites.

This proposed method, however, is less than ideal because only two signals are processed at the same time, namely the unknown signal and the compensation signal. If the compensation signal is degraded in some way due to signal propagation, momentary antenna mispointing, or other effects, then the entire set of data obtained must be discarded. Furthermore, it is also necessary to observe one or more additional signals from known positions in order to correct any inaccuracies in the satellite orbits. This means that observations of the unknown signal must be interleaved with observations of other calibrating signals, which degrades both the accuracy and the speed with which the position of the unknown transmitter can be determined. This fact is due to the unpredictable nature of the local oscillator phase changes and unmodeled variations in the satellite orbits. The amount of time required for a satisfactory set of data to be obtained is thus greater than would be the case if all signals of interest were observed simultaneously.

In the method described in the INTELSAT report, such a mode of obtaining data would require large increases in the expense of the equipment because separate signal paths and correlators would be required for each signal. Furthermore, since each signal is observed with a separate set of equipment, instrumental effects within the separate sets of equipment may result in unremovable systematic errors in the data. Thus, it is desirable to perform the frequency compensation more rapidly and at minimum expense by observing all signals of interest simultaneously with one set of equipment in one correlation process.

SUMMARY OF THE INVENTION

The principal advantage of the present invention is the provision of a method and system that substantially obviates one or more of the limitations and disadvantages of the described prior methods and systems.

Another advantage of the invention is more accurate determination of the location of an unknown transmitter.

A further advantage of the invention is increased sensitivity to interfering signals from unknown sources.

Still another advantage of the invention is quicker determination of the location of an unknown transmitter.

Yet another advantage of the invention is precise compensation for local oscillator phase fluctuations on the satellites on all time scales.

Additional features and advantages of the invention will be set forth in the description which follows and in part will be apparent from the description or may be learned by practice of the invention. The objectives and other advantages of the invention will be realized and attained by the method and system particularly pointed out in the written description and claims hereof as well as the appended drawings.

To achieve these and other advantages and in accordance with the purpose of the invention, as embodied and broadly described, the invention includes, a method of phase calibrating oscillators located on at least two satellites, comprising the steps of retransmitting from the at least two satellites an interfering signal and a phase-calibrating signal; observing a band of frequencies encompassing a frequency of the interfering signal and a frequency of the phase-calibrating signal; receiving signals within the band of frequencies; simultaneously cross-correlating the received signals; isolating a portion of the cross-correlated signals corresponding to the phase-calibrating signal; determining from the isolated portion a phase function representative of at least one of phase and frequency discrepancies between oscillators located on the at least two satellites; and phase calibrating remaining portions of the cross-correlated signals in accordance with the phase function.

In another aspect, the invention includes a system for phase-calibrating signals to locate an unknown transmitter, comprising at least two satellites receiving and retransmitting an interfering signal and a phase-calibrating signal; at least two antennas, each antenna simultaneously receiving a band of signals from a respective satellite, the band of signals including the interfering signal and the phase-calibrating signal; means for phase calibrating the received signals; and means for locating the unknown transmitter in accordance with the phase-calibrated signals, wherein the phase-calibrating means includes means for simultaneously cross-correlating the band of signals.

In a further aspect, the invention includes a method of phase calibrating signals to locate an unknown signal position, comprising the steps of receiving and retransmitting, from at least two satellites, an interfering signal, a phase-calibrating signal, and at least one position-calibrating signal; observing a band of frequencies encompassing a frequency of the interfering signal, a frequency of the phase-calibrating signal, and frequencies of the at least one position-calibrating signal; receiving signals within the band of frequencies; simultaneously cross-correlating the received signals; isolating a portion of the cross-correlated signals corresponding to the phase-calibrating signal; determining from the isolated portion a phase function representative of at least one of a phase discrepancy and a frequency discrepancy between oscillators located on the at least two satellites; phase calibrating remaining portions of the cross-correlated signals for the unknown and position-calibrating signals in accordance with the phase function; and determining the unknown signal position in accordance with the phase-calibrated portion of the cross-correlated signal corresponding to the unknown signal.

It is to be understood that both the foregoing general description and the following detailed description are exemplary and explanatory and are intended to provide further explanation of the invention as claimed.

BRIEF DESCRIPTION OF DRAWINGS

The accompanying drawings, which are incorporated in and constitute a part of this specification, illustrate embodiments of the invention and, together with the description, serve to explain the objects, advantages, and principles of the invention.

In the drawings.

DETAILED DESCRIPTION

Reference will now be made in detail to the present preferred embodiment of the invention, which is illustrated in the accompanying drawings in which like reference characters refer to corresponding elements.

The method and system of the invention accurately and quickly determine the location of an unknown transmitter using calibrated oscillator phases. To this end, at least two satellites retransmit interfering signals and phase-calibrating signals at different, but known, frequencies. These signals are observed simultaneously in a single passband wide enough to encompass the frequencies of these signals and are cross-correlated together, thereby greatly improving the speed of processing the data. The interfering signals and phase-calibrating signals can then be separated according to their respective frequencies by performing the appropriate Fourier transforms in the delay-frequency domain. Using these results, the location of the unknown transmitter can be accurately identified in accordance with conventional techniques.

Figure 1:
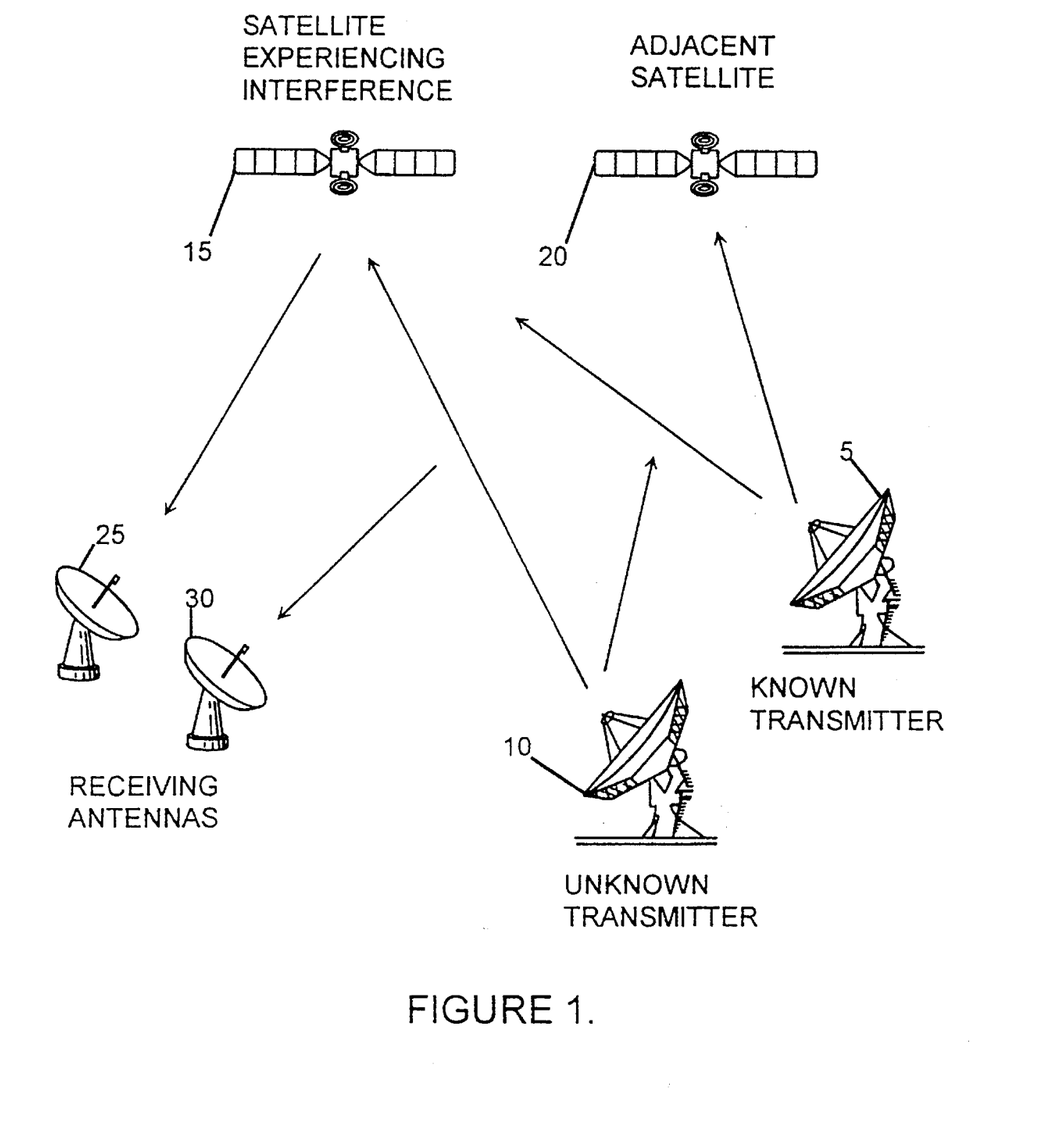
FIG. 1 illustrates a satellite communications system in accordance with the invention.

FIG. 1 illustrates a satellite communications system in accordance with one embodiment of the invention. As shown in FIG. 1, the system preferably includes a known transmitter 5, an unknown transmitter 10, two geosynchronous satellites 15 and 20, and ground antennas 25 and 30.

In this embodiment, transmitter 5 transmits a phase-calibrating signal, which is used to calibrate the phase of signals transmitted by satellites 15 and 20, as discussed in greater detail below. The frequency of the phase-calibrating signal and the location of transmitter 5 are preferably known.

Transmitter 10 transmits an interfering signal which causes interference at satellite 15. In one embodiment, unknown transmitter 10 is substantially pointed to satellite 15. Also, prior to performance of the method of the invention, the location of transmitter 10 is unknown.

Satellites 15 and 20 are both equipped with similar receiving, amplifying, frequency conversion, and retransmission equipment. The frequency conversion equipment of each of the satellites includes a local oscillator controlled by a crystal oscillator serving as a frequency reference. As noted above, the crystal oscillators on these satellites 15 and 20 are independent from each other and, therefore, are subject to frequency or phase drifting.

Although nominally geosynchronous, satellites 15 and 20 may have some residual motion with respect to each other. This residual motion causes a Doppler effect on the signals received at antennas 25 and 30 from satellites 15 and 20 and, thus, affects the determination of the location of unknown transmitter 10. As disclosed in the '679 patent, the Doppler effect from the residual motion can be predicted and offset using an offset local oscillator at the receiving antennas, which is described below.

In a preferred embodiment, antenna 25 is pointed at satellite 15 and receives the retransmitted signals from satellite 15. Antenna 25 preferably receives signals within a wide receiver passband that encompasses both the interfering signal originating from unknown transmitter 10 and the phase-calibrating signal originating from known transmitter 5 as retransmitted by satellite 15. Other signals having frequencies within the passband can also be received at antenna 25.

In addition, antenna 30 is preferably pointed at satellite 20 and receives retransmitted signals from satellite 20. Like antenna 25, antenna 30 preferably receives signals within a wide receiver passband that encompasses both the interfering signal originating from unknown transmitter 10 and the phase-calibrating signal originating from known transmitter 5 as retransmitted by satellite 20. Other signals having frequencies within the passband can also be received at antenna 30.

In accordance with a preferred embodiment, both receiving antennas 25 and 30 are located near each other, in which case the signals received by these antennas can be processed in real time. Alternatively, however, antennas 25 and 30 could be remotely located, in which case the signals from one antenna are either transmitted long-distance in real time along a communications channel or are recorded for processing at some future time.

Figure 2:
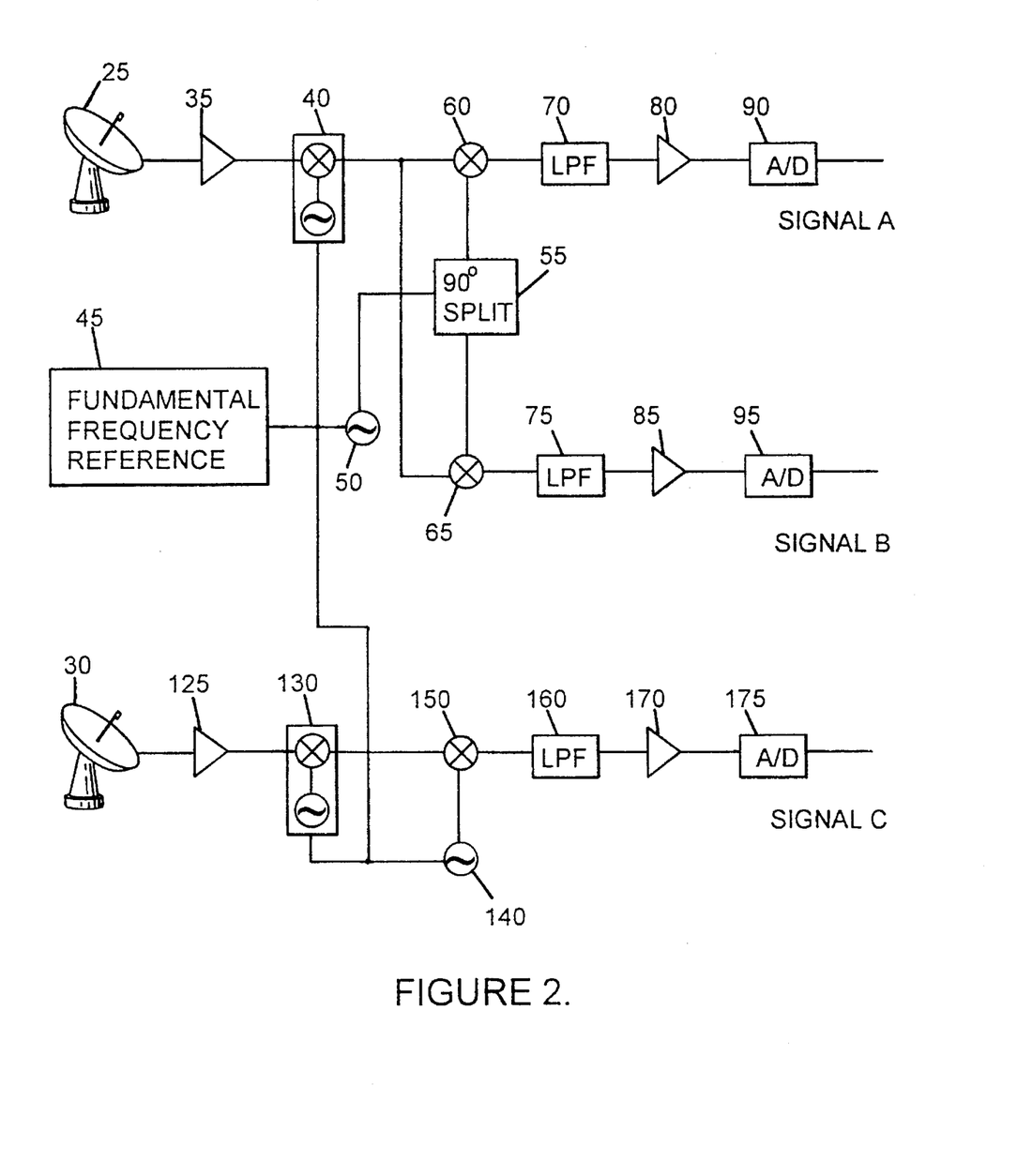
FIG. 2 illustrates an analog signal processing path for the ground antennas shown in FIG. 1 in accordance with the invention.

FIG. 2 illustrates an analog signal processing path for the antennas 25 and 30. In this embodiment, antennas 25 and 30 are located near each other and are connected to various components to produce signals A, B, and C.

As discussed above, antenna 25 preferably receives signals retransmitted by satellite 15 having frequencies within a passband. Low-noise amplifier 35 amplifies the received signals, which are converted to an intermediate frequency or frequencies by mixer 40. Mixer 40 contains a local oscillator, which is phase-locked to fundamental frequency reference 45.

The signal from mixer 40 is split two ways using a 0-degree splitter (not shown) and identical-length propagation paths so that the signal is applied equally to single-sideband mixers 60 and 65. In an alternative embodiment, double-sideband mixers could be used instead of mixers 60 and 65 but at a reduction in signal-to-noise ratio. In accordance with one embodiment, mixers 60 and 65 convert the signal from mixer 40 to baseband in phase quadrature, though conversion to a different intermediate frequency is also possible.

Mixers 60 and 65 use a local oscillator signal supplied by oscillator 50, which is phase-locked to fundamental frequency reference 45. For mixers 60 and 65, the splitting of the signal from oscillator 50 is accomplished by a 90-degree splitter 55, so that the signals emerging from mixers 50 and 65 are at the same frequency but in phase quadrature.

The signals from mixer 60 and 65 are filtered by low-pass filters 70 and 75. Preferably, low-pass filters 70 and 75 have passbands that are broad enough to encompass the interfering signal from unknown transmitter 10 and the phase-calibrating signal from known transmitter 5. The passbands may also be broad enough to encompass other desired signals.

The filtered signals from low-pass filters 70 and 75 are applied to amplifiers 80 and 85 and then to analog-to-digital converters 90 and 95, respectively. The output of converters 90 and 95 are digital samples, shown as signals A and B, respectively. In accordance with a preferred embodiment of the invention, signals A and B are in phase quadrature with respect to each other.

Depending upon the parameters of the processing carried out by the method of this invention, the quantization level in the analog-to-digital converters 90 and 95 may be 1 bit, 2 bits, or multiple bits. If multiple-bit conversion is used, then quadrature signal B may be generated from signal A through digital signal processing, though such conversion and generation may be more costly.

Signals A and B are obtained in quadrature with each other to maximize signal-to-noise ratio and eliminate frequency ambiguities in the processed data. The sampling rate is preferably carried out in accordance with the Nyquist theorem to encompass the entire bandpass; that is, the sampling rate is preferably at least twice the maximum frequency component contained within the total bandpass, which is digitized, to avoid aliasing effects.

Turning now to the signal receive at antenna 30, low-noise amplifier 125 amplifies this signal and mixer 130 converts the amplified signal to an intermediate frequency. Like mixer 40, mixer 130 preferably contains a local oscillator, which is phase-locked to fundamental frequency reference 45.

The signal from mixer 130 is then applied to single-sideband mixer 150, which preferably converts this signal to baseband. Again, a double-sideband mixer could be used instead of mixer 150 but at a reduction in signal-to-noise ratio. Also, mixer 130 could alternatively convert the signal from mixer 130 to an intermediate frequency other than baseband. Mixer 150 employs a local oscillator signal from oscillator 140, which is phase-locked to fundamental frequency reference 45.

Predictable oscillator offsets between the two satellites 15 and 20 can be removed by offsetting oscillators 50 and 140 by an amount approximately equal to those offsets. Any additional frequency difference remaining is called the residual frequency.

Low-pass filter 160 filters the signals from mixer 150. Low-pass filter 160 is preferably set to the same bandpass as low-pass filters 70 and 75. The filtered signal from low-pass filter 160 is amplified by amplifier 170 and converted to a digital signal C by analog-to-digital converter 175. The quantization level employed in converter 175 is preferably the same as used in converters 90 and 95.

In a preferred embodiment, signal C covers the same frequency band as signals A and B but represents the signal power in the processed band from satellite 20 rather than from satellite 15. Thus, signal C preferably contains contributions from the transmitting antenna sidelobes of unknown transmitter 10 and the phase-calibrating signal from the transmitting antenna sidelobes of known transmitter 5.

Where antennas 25 and 30 are located remotely from each other, each of the antennas 25 and 30 can be connected to a separate analog signal processing signal similar to the corresponding portion of the analog signal processing paths shown in FIG. 2. Thus, in that case, while signals A, B, and C are obtained in a manner similar to that discussed in connection with FIG. 2, signals A and B are available it a site near antenna 25 and signal C is available at a site near antenna 30.

Also, where antennas 25 and 30 are remotely located, a separate frequency reference is preferably employed for each of the analog signal processing paths in place of fundamental frequency reference 45. Although these separate frequency references will produce an additional frequency offset between the two sites, this offset will be common to signals A, B, and C, and will consequently be removed in accordance with the method of the invention.

It is necessary, however, for signals A, B, and C to be available at the same site for processing. To this end, signal C can be transmitted to the site near antenna 25 over a high-speed data link (not shown) during data acquisition or shortly thereafter. In such a case, some buffering and formatting of the data will generally be required in accordance with conventional techniques. In addition, precise time synchronization between the two sites is preferred to enhance accuracy and can be accomplished by suitably stable reference oscillators, Global Positioning System transmissions, and other means. Some time reference, typically a signal at 1 pulse per second (pps), is preferably provided to synchronize data acquisition. If a high-speed communications link is not available, then the sampled data may be recorded on magnetic tape or other high-capacity medium and transported to a common site where subsequent processing occurs.

Figure 3:
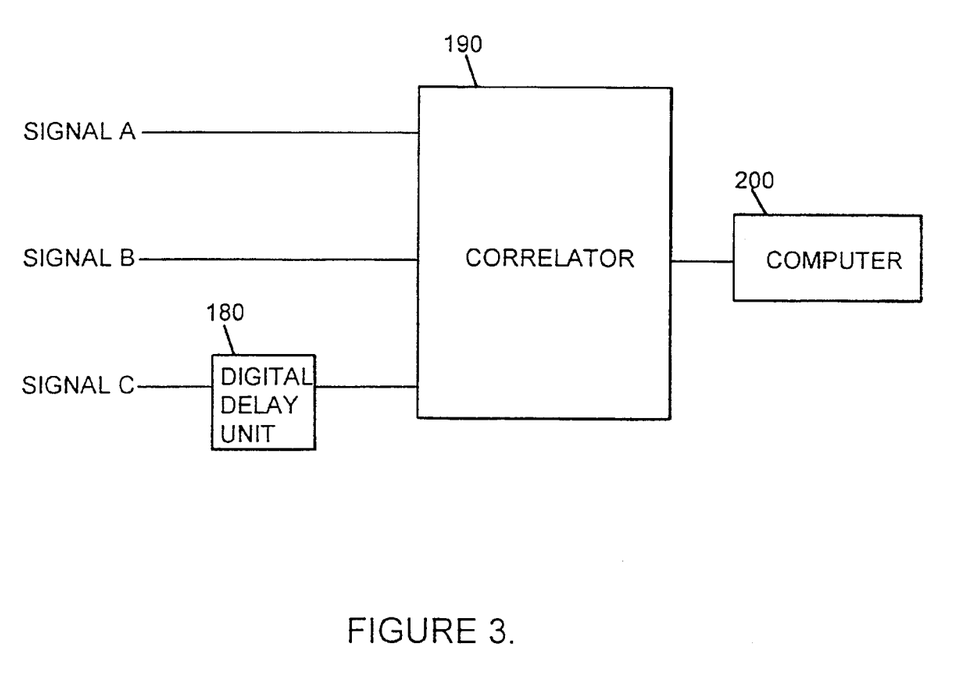
FIG. 3 illustrates a block diagram of a system for performing cross-correlation in accordance with the invention.

FIG. 3 shows a block diagram of a system for performing cross-correlation of signals A, B, and C in accordance with the invention. Signal C is applied to a programmable digital delay unit 180, which compensates for most of the geometric delay for a transmitter at the position producing the signal, and then to correlator 190. Signals A and B are shown in FIG. 3 to be applied directly to correlator 190.

Correlator 190 cross-correlates the signals A, B, and C at multiple delays in the manner described in the '679 patent. Specifically, correlator 190 generates the cross-correlation function, also known as the ambiguity function, represented by the products C×A and C×B. Correlator 190 transmits the resulting products to computer 200, which also controls the correlation process and is preferably responsible for controlling all other system functions as well. Once signals A, B, and C have been obtained and cross-correlated, cross-products of the original signals result.

In accordance with the invention, since signals A, B, and C contain contributions from both the interfering signal and phase-calibration signal, cross-correlating signals A, B, and C results in the interfering and phase-calibration signals being cross-correlated simultaneously. Accordingly, short-term and long-term changes in signal phase due to local oscillator fluctuations and changing Doppler frequency shift can be compensated since these changes in signal phase are identically present in the cross-correlation products. As discussed in greater detail below, for each signal within the processed bandpass, appropriate data processing permits separation of the signals in both frequency and delay space.

To remove all phase fluctuations which affect the sensitivity of detection and accuracy of measurement of the interfering signal, the portion of the cross-correlation function relating to the phase-correlating signal is preferably isolated to determine the appropriate delay necessary for phase calibration.

Figure 4:
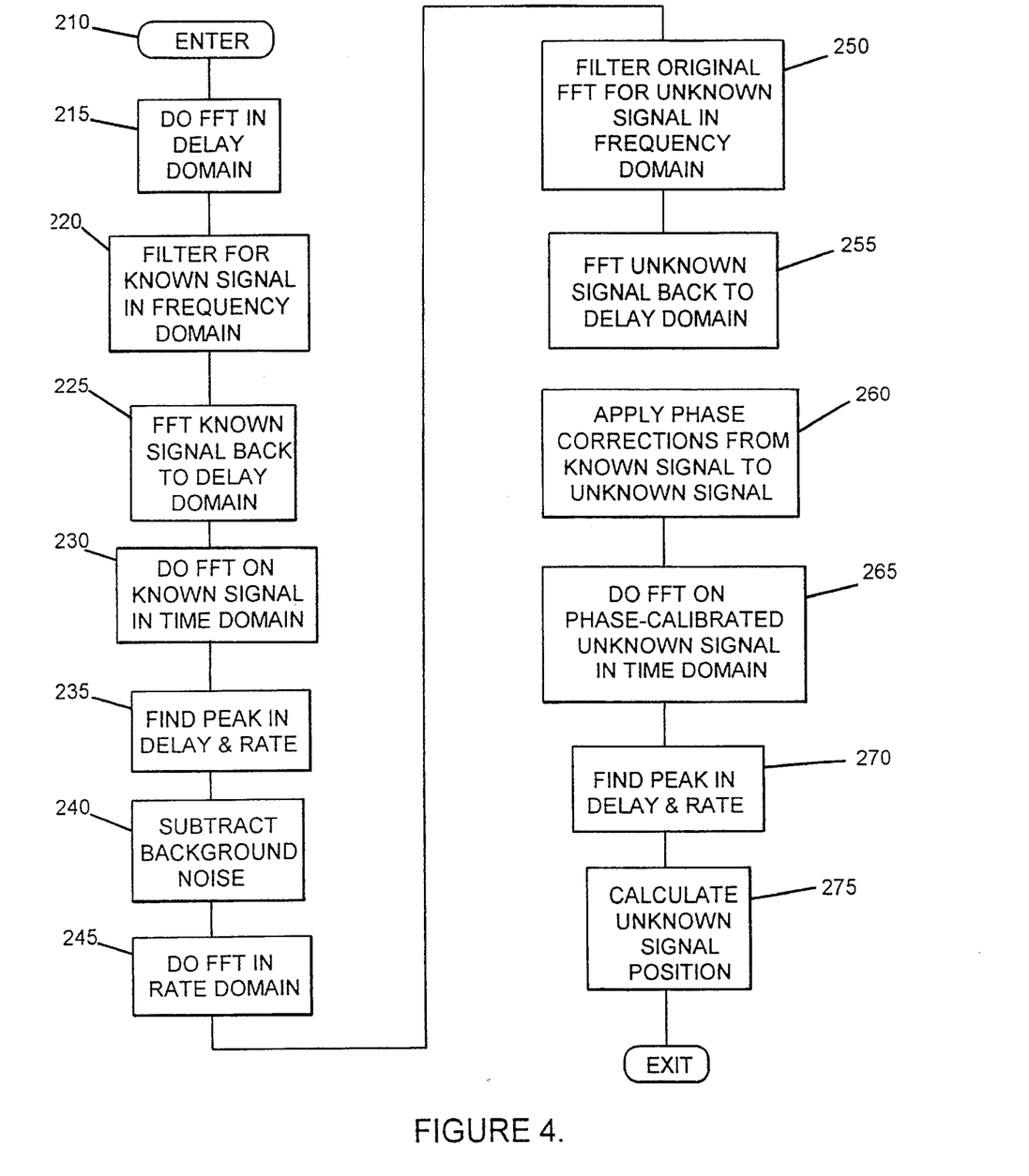
FIG. 4 illustrates a flow chart depicting a method of applying phase calibration in accordance with the invention.

FIG. 4 illustrates a flow chart depicting a method of processing the cross-correlated signals in accordance with one embodiment of the invention.

According to FIG. 4, when the processing equipment is operational (step 210), a Fourier transform is performed in the delay domain on the cross-correlation function (step 215), resulting in a frequency-domain function representative of power as a function of frequency. This frequency-domain function is stored in a memory (not shown).

The phase-calibrating signal is isolated by filtering the frequency-domain function. This can be accomplished by setting the frequency-domain function to zero outside the frequency region occupied by the phase-calibrating signal (step 220). The phase-calibrating signal is Fourier transformed back to the delay domain (step 225) and then Fourier transformed in the time domain (step 230). This transformed signal is then examined for a peak in delay and residual frequency offset (step 235). Particularly, the transformed signal is searched for peaks to find the time difference of arrival (TDOA) and frequency difference of arrival (FDOA) maximum of this signal.

Figure 5:
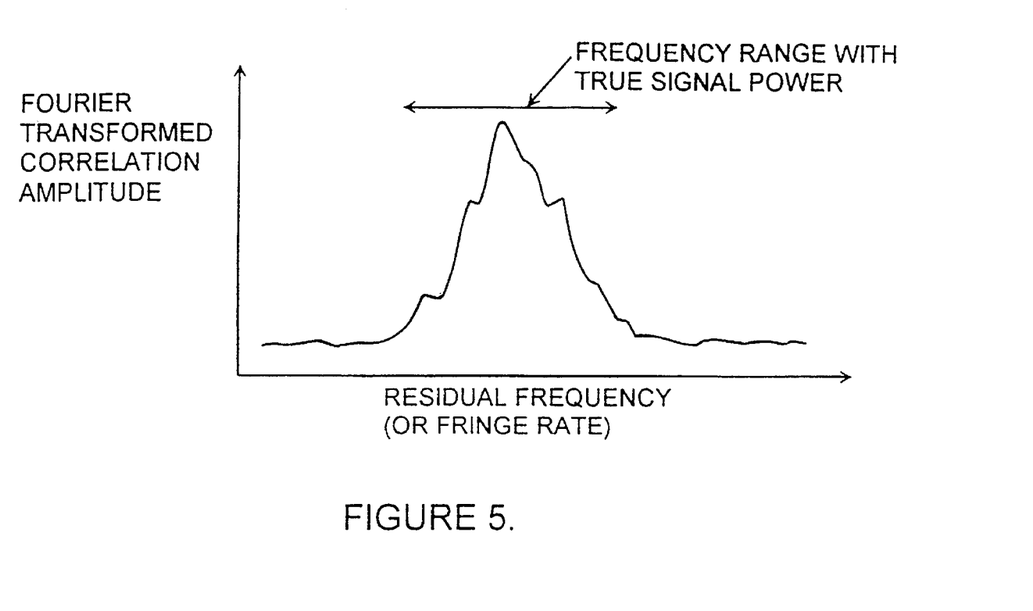
FIG. 5 illustrates a signal produced by drifted local oscillators.

At the value of delay having a maximum cross-correlation amplitude, the amplitude as a function of residual frequency is known as the fringe rate spectrum. An example of such a fringe rate spectrum in a typical satellite case is shown in FIG. 5. If the oscillators on satellites 15 and 20 were phase-locked to each other and to the same ground frequency reference, the function would show a single, sharp peak. Instead, FIG. 5 shows a complex structure having an amplitude at each frequency that is proportional to the amount of time the residual frequency was at that particular value. Since the amplitude of the cross-correlated signal is generally small, its low signal-to-noise ratio results in significant power in the fringe rate spectrum, even outside the plausible range of frequency difference between the satellite oscillators. This is indicated in FIG. 5 by the nonzero noise floor outside the central complex peak.

If the same observation is repeated, the fringe rate spectrum will look similar, though not identical, since the random excursions of the satellite oscillators will be different from one interval to the next. However, the overall envelope of the fringe rate spectrum will be generally similar. By statistical analysis, it is possible to determine that range in the fringe rate spectrum over which there is significant power due to a true cross-correlation and not merely to noise.

The frequency range over which there is true signal power is determined, and the correlation amplitude outside that range is set to zero (step 240). The signal is Fourier transformed back from the rate domain into the time domain (step 245). The resulting function is similar to the original cross-correlation function, but the noise level is significantly reduced. Due to the complexity of this function, for each point in time (corresponding to a correlator integration period), the phase of the reference signal can be determined by a fitting process, which minimizes the error in the estimated phases.

Following these steps preferably yields an estimate of phase as a function of time for the phase-calibrating signal. The original Fourier transform determined in step 215 is filtered for the frequency band appropriate to the unknown signal (step 250). Such filtering may be a simple bandpass function or a more complex weighting function adapted to the spectrum of the signal, which maximizes the signal-to-noise ratio. Next, the phase function determined in step 245 is subtracted from the filtered cross-correlation function of the unknown signal (step 260). This is accomplished in the time domain on a point-by-point basis. The phases of the unknown signal are accordingly corrected and frequency (or phase) fluctuations in the satellite local oscillators are eliminated.

Figure 6:
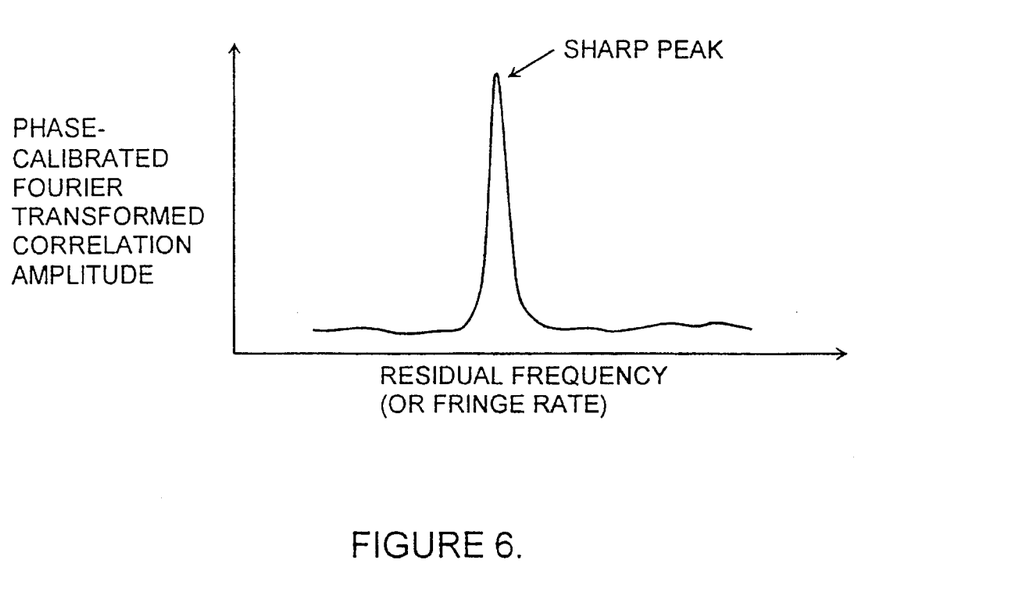
FIG. 6 illustrates a signal produced by synchronized local oscillators.

The phase-corrected data for the unknown signal are Fourier transformed in the time domain (step 265), resulting in a fringe rate spectrum having a single, sharp peak as shown in FIG. 6. This spectrum may still contain some fluctuations due to noise in the cross-correlation function of both the calibrating and unknown signals, but preferably all the power in the signal is concentrated at a single frequency of the unknown signal, instead of being spread out over a range of frequencies.

This phase-calibration method greatly increases the detectability of the unknown signal. It also greatly increases the accuracy of the FDOA information, since the frequency is much more precisely determined with the use of phase calibration. Furthermore, the increase in bandpass permits simultaneous observation of multiple signals, such as position calibrating signals or other unknown signals. Each signal may be further separated from other signals by filtering with regard to other criteria, such as restricted time intervals during which the signal is present.

The delay and rate are determined by identifying the peak of the signal (step 270). This step is similar to that carried out in the '679 method, except that the frequency found is the net difference frequency between the calibrating and interfering signals. This net difference arises from both the RF frequency difference and the geographical separation of the transmitters responsible for transmitting these signals. The net difference is typically 1 Hz, but could be more or less. A position of unknown transmitter 10 can be determined based upon the position of transmitter 5 emitting the phase-calibrating signal, the observing frequencies, the observed delay and rate, the positions of the receiving antennas, and the positions and velocities of the satellites (step 275).

The normal coherent integration time without phase calibration is limited by the phase fluctuations to approximately that interval of time required for the two satellite oscillator phases to diverge by one radian. There is no gain in signal-to-noise ratio for longer times since the power will be spread out over a larger and larger range of the fringe rate spectrum. Integrating for a very long time compared to the coherence time may make the signal undetectable.

However, with the phase calibration method, given a strong calibrating reference signal, the phases may be corrected for an indefinite time interval. In effect, the entire system, including satellite oscillators, becomes phase coherent. Since the signal-to-noise ratio is proportional to the square root of the effective coherent integration time, large improvements may be noted. The typical coherence time of satellite local oscillators is 2 to 10 seconds. With phase calibration, this may be easily extended to several hundred seconds.

In the data processing heretofore described, the samples from a plurality of baseband converters are cross-multiplied at a plurality of delays, and the results are accumulated to obtain an estimate of the cross-correlation function. It is possible in an alternative embodiment to obtain the cross-correlation function by a different, but equivalent, set of mathematical operations on the data. Instead of the correlator depicted in FIG. 3, for example, a real-time Fourier transform engine could be employed. In this embodiment, a series of samples of determinate length, such as 1024 samples, is input from each sample stream into special high-speed Fourier transform hardware. The resulting Fourier transforms $F(\omega)$ from each of the signals A, B, and C are then multiplied together according to the relation:

$$E_{AB}(\omega) = F^*_A(\omega) \cdot F_B(\omega), \text{ etc.,}$$

where $E_{AB}(\omega)$ is the cross-power spectrum of the signals A and B, and the asterisk ("*") indicates complex conjugation. The cross-correlation function may be obtained from the cross-power spectrum if desired by a further Fourier transform. All subsequent processing is preferably the same as in the previous embodiment.

Further, while the method described herein is implemented in hardware, the Fourier transformation and cross multiplications could alternatively be carried out in software. The resulting functions, the application of phase calibration, and all subsequent processing of TDOA and relative FDOA information would remain the same.

It is thus possible, with suitable data processing, to find the TDOA and FDOA information for any number of signals simultaneously. In an extreme case, the entire satellite spectrum, typically 500 MHz wide, can be sampled and cross-correlated with a sample rate of 1 GHz, and every signal present processed simultaneously. To perform this separation by baseband (ultimately RF) frequency, the cross-correlation function is preferably determined over a wide range of delay values. For example, if the narrowest signal of interest has a bandwidth of 25 kHz, and the entire spectrum is 500 MHz wide, then the cross-correlation function is measured for at least 40,000 delay values.

It will be apparent to those skilled in the art that various modifications and variations can be made in the method and apparatus of the present invention without departing from the scope or spirit of the invention. Thus, it is intended that the present invention cover the modifications and variations of this invention provided they come within the scope of the appended claims and their equivalents.

What is claimed:

1. A method of phase calibrating oscillators located on at least two satellites, comprising the steps of:

retransmitting from the at least two satellites an interfering signal and a phase-calibrating signal;

observing a band of frequencies encompassing a frequency of the interfering signal and a frequency of the phase-calibrating signal;

receiving signals within the band of frequencies;

simultaneously cross-correlating the received signals;

isolating a portion of the cross-correlated signals corresponding to the phase-calibrating signal;

determining from the isolated portion a phase function representative of at least one of phase and frequency discrepancies between oscillators located on the at least two satellites; and phase calibrating remaining portions of the cross-correlated signals in accordance with the phase function.

2. The method according to claim 1, wherein the step of phase calibrating remaining portions includes the step of subtracting the phase function from remaining portions of the cross-correlated signals on a point-by-point basis.

3. The method according to claim 1, wherein the step of isolating includes frequency filtering the cross-correlated signals in a frequency-domain function.

4. The method according to claim 1, wherein the band of frequencies are observed at two antennas located near each other.

5. The method according to claim 1, wherein the frequency of the interfering signal and the frequency of the phase-calibrating signal are different from each other.

6. The method according to claim 1, wherein the band of frequencies are observed at two antennas located remotely from each other.

7. The method according to claim 6, wherein received signals received at one antenna site are transmitted to the other antenna site.

8. A method of locating an unknown transmitter emitting an interfering signal, comprising the steps of:

retransmitting from at least two satellites an interfering signal and a phase-calibrating signal;

observing a band of frequencies encompassing a frequency of the interfering signal and a frequency of the phase-calibrating signal;

receiving signals within the band of frequencies;

simultaneously cross-correlating the received signals;

isolating a portion of the cross-correlated signals corresponding to the phase-calibrating signal;

determining from the isolated portion a phase function representative of at least one of phase and frequency discrepancies between oscillators located on the at least two satellites;

phase calibrating remaining portions of the cross-correlated signals in accordance with the phase function; and locating the unknown transmitter in accordance with the phase-calibrated portions.

9. The method according to claim 8, wherein the step of locating the unknown transmitter includes the steps of:

isolating a portion of the phase-calibrated portions corresponding to the interfering signal;

determining time difference of arrival data and frequency difference of arrival data from the isolated portion corresponding to the interfering signal; and determining a location of the unknown transmitter based upon the time difference of arrival data and frequency difference of arrival data.

10. The method according to claim 8, wherein the frequency of the interfering signal and the frequency of the phase-calibrating signal are different from each other.

11. A method of phase calibrating signals to locate an unknown signal position, comprising the steps of:

receiving and retransmitting, from at least two satellites, an interfering signal, a phase-calibrating signal, and at least one position-calibrating signal;

observing a band of frequencies encompassing a frequency of the interfering signal, a frequency of the phase-calibrating signal, and frequencies of the at least one position-calibrating signal;

receiving signals within the band of frequencies;

simultaneously cross-correlating the received signals;

isolating a portion of the cross-correlated signals corresponding to the phase-calibrating signal;

determining from the isolated portion a phase function representative of at least one of a phase discrepancy and a frequency discrepancy between oscillators located on the at least two satellites;

phase calibrating remaining portions of the cross-correlated signals for the unknown and position-calibrating signals in accordance with the phase function; and determining the unknown signal position in accordance with the phase-calibrated portion of the cross-correlated signal corresponding to the unknown signal.

12. The method according to claim 11, wherein, in the phase-calibrating step, the phase function is applied in a like manner to the portions of the cross-correlated signals corresponding to the unknown and position-calibrating signals.

13. The method according to claim 11, further comprising the step of determining positions of the at least two satellites in accordance with the phase-calibrated portion of the cross-correlated signal corresponding to the position-calibrating signal.

14. A system for phase calibrating signals to locate an unknown transmitter, comprising:

at least two satellites receiving and retransmitting an interfering signal and a phase-calibrating signal;

at least two antennas, each antenna simultaneously receiving a band of signals from a respective satellite, the band of signals including the interfering signal and the phase-calibrating signal;

means for phase calibrating the received signals; and means for locating the unknown transmitter in accordance with the phase-calibrated signals, wherein the phase-calibrating means includes means for simultaneously cross-correlating the band of signals.

15. The system according to claim 14, wherein the at least two antennas are located near each other.

16. The system according to claim 14, wherein the at least two antennas are located remotely from each other, and further including means for transmitting the received band of signals from one antenna site to another antenna site.

17. The system according to claim 14, wherein the frequency of the interfering signal and the frequency of the phase-calibrating signal are different from each other.

18. A system for phase calibrating signals to locate an unknown signal position, comprising:

at least two satellites receiving and retransmitting an interfering signal, a phase-calibrating signal, and at least one position-calibrating signal;

at least two antennas, each antenna simultaneously observing a band of frequencies encompassing a frequency of the interfering signal, a frequency of the phase-calibrating signal, and frequencies of the at least one position-calibrating signal, and receiving signals having frequencies within the band;

means for simultaneously cross-correlating the received signals;

means for isolating a portion of the cross-correlated signals corresponding to the phase-calibrating signal;

means for determining from the isolated portion a phase function representative of at least one of a phase discrepancy and a frequency discrepancy between oscillators located on the at least two satellites;

means for phase calibrating remaining portions of the cross-correlated signals for the unknown and position-calibrating signals in accordance with the phase function; and means for determining the unknown signal position in accordance with the phase-calibrated portion of the cross-correlated signal corresponding to the unknown signal.

19. The method according to claim 18, wherein the phase-calibrating means applies the phase function in a like manner to the portions of the cross-correlated signals corresonding to the unknown and position-calibrating signals.

20. The method according to claim 18, further comprising means for determining positions of the at least two satellites in accordance with the phase-calibrated portion of the cross-correlated signal corresponding to the position-calibrating signal.

* * * * *